United States Patent Office 3,556,971
Patented Jan. 19, 1971

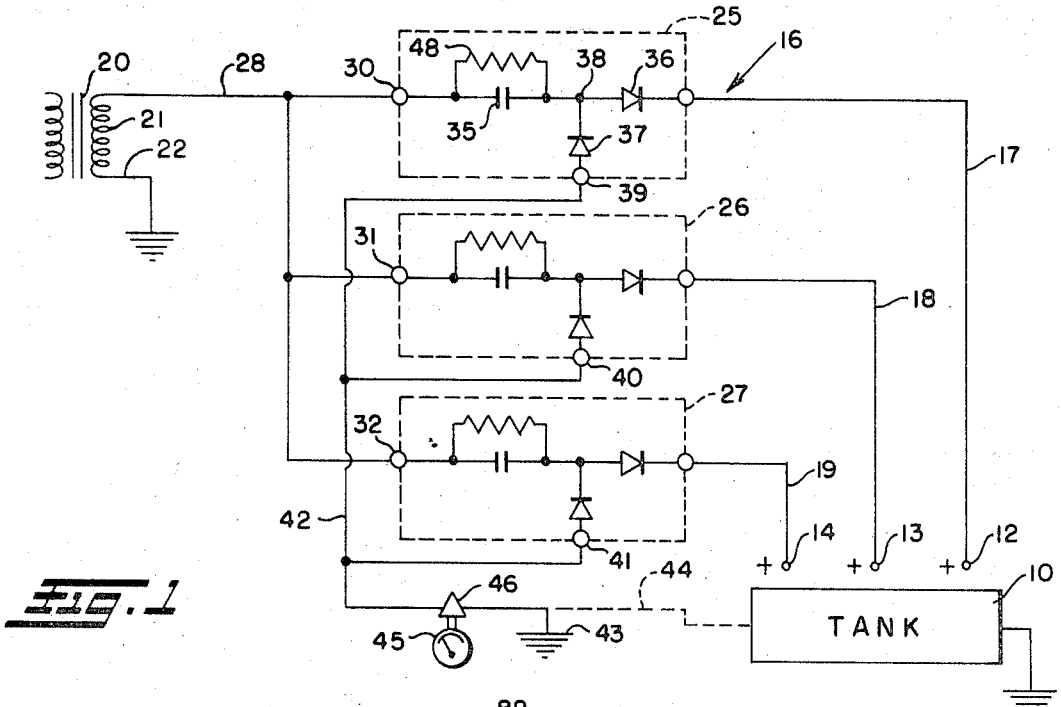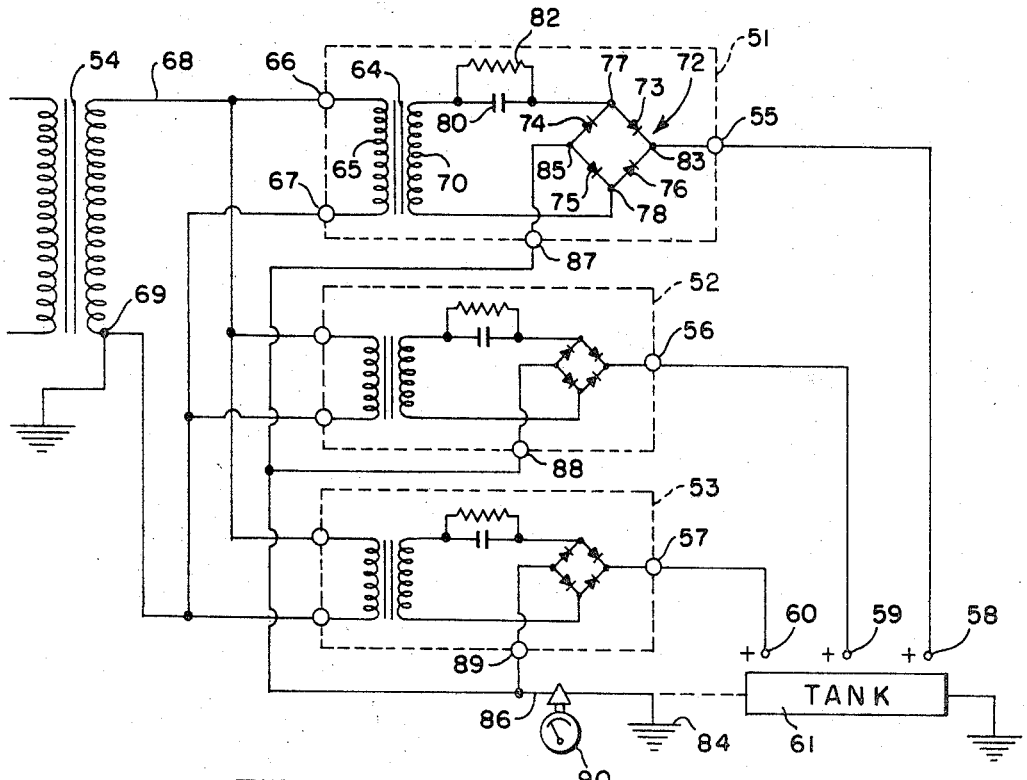

3,556,971
**SELF-REGULATING CATHODIC
PROTECTION SYSTEMS**
Bernard Husock, South Euclid, Ohio, assignor to Harco
Corporation, Cleveland, Ohio, a corporation of Ohio
Filed Apr. 10, 1968, Ser. No. 720,106
Int. Cl. C23f *13/00*
U.S. Cl. 204—196                                    5 Claims

ABSTRACT OF THE DISCLOSURE

A cathodic protection system for supplying relatively constant current to underground protected devices consisting of an anode array buried adjacent to the protected device and a capacitor input, solid 'state rectifier arrangement for providing direct current to the array at a regulated value. A full-wave rectifier in combination with an isolation transformer or a direct-coupled half wave configuration is employed, the latter utilizing the conduction of a second rectifier to prevent a DC level from appearing on the power lines.

---

This invention relates generally as indicated to cathodic protection systems and more particularly to certain improvements in such systems wherein a more simplified and economical form of apparatus produces superior results in providing constant current to a protected device.

Such cathodic protection systems have become well established in the art as a means of protecting underground storage devices and the like, from deterioration due to electrolytic action between the device and its environment. Due to the fact that soil conditions may vary from area to area and from time to time, due not only to the chemical composition of a certain area but also to the moisture level variations occurring therein, it is a requisite that any protective systems of this type be suitably designed to accommodate for these varying conditions. Further, problems are encountered in some communities in that varying code regulations may be applied to equipment of this type and in the interest of the safest possible operation, it is necessary that such equipment be adaptable or compatible with these codes. Still further, this type of equipment is designed to protect devices over a long period of time and consequently, such equipment must have a long inherent lifetime so that maintenance, if not completely eliminated, is held to a minimum. In this last regard prior art devices particularly have been found not highly reliable in that these systems usually obtain their voltage from the readily available 115 volt AC power lines and must convert this to a utilizable value, usually somewhat lower. Accordingly, heat dissipation has been a prime problem not only in expending excessive amounts of power but also in causing an accelerated deterioration of the components of the system.

Therefore, it is an object of this invention to provide an improved cathodic protection system which is effective to provide a well regulated output from existing power lines and which is more reliable and economical than prior existing devices.

It is another object of this invention to provide an improved cathodic protection system which dissipates a minimal amount of heat and thus provides a longer life of operation.

It is still another object of this invention to provide an improved cathodic protection system which conforms to the code regulations of many different areas and is effective to prevent an unbalanced distribution of power from the source supply lines.

It is yet another object of this invention to provide such a system which has inherent self-restoring or protection features therein for component failures and breakdowns due to defects or to externally introduced effects such as lightning strokes.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 1 is a first embodiment of the teachings of this invention showing a circuit diagram of the preferred form of the system.

FIG. 2 is a circuit diagram of a second embodiment of this invention.

Referring now to FIG. 1, there is shown a protected device 10 which may be, for example, a storage tank which is buried underground and which is to be protected from the electrolytic corrosive action of the surrounding ground. A plurality of anodes 12–14 are shown similarly buried in the ground in a predetermined pattern in relation to the storage tank 10. The particular configuration and positioning of the anodes 12–14 in relation to the tank must be determined for varying locations but, however, does not significantly relate to the teachings of this invention. For purposes of this description it may be assumed that in order to protect an underground device sufficient current must be set up from the anode array to the device to eliminate the inherent electrolytic action. Since each anode is capable of contributing a specified amount of current, the total number may be approximated by determining the total current required. However, the final array configuration will be determined by ground conditions, the type of device to be protected and, most importantly, the prior experience with such systems.

Leading from the anodes 12–14 to the cathodic protection supply device shown generally at 16, are insulated wires 17–19 which transmit the current to the anodes, usually over a relatively long distance. The secondary winding 21 of a power transformer 20 is shown as the source of supply for this circuitry and such transformer is usually the typical power transformer serving a plurality of households or commercial establishments and often located on utility poles. It is significant that the circuitry of this preferred embodiment is energized directly from such power transformer 20 and as will be pointed out in greater detail hereinafter, the fact that the neutral lead 22 of the transformer is usually a ground connection necessitates the novel configuration depicted in this preferred embodiment.

The circuitry for energizing each of the anodes 12–14 is housed in plug-in type can units 25–27 shown in FIG. 1 in dashed lines, there being an identical can for each anode of the system. Conveniently each of these cans 25–27 which is a typical installation may be on the order of ten in number, is housed in a location remote both from the anode and tank area and from the source of power, the transformer 20. An input power line 28 is connected from the energized or "hot" side of the power transformer 20 to the input terminals 30–32 of each of the cans 25–27 and the cans thus are connected in series with the anodes 12–14. For purposes of description, the circuit of only one can 25 will be detailed, since all are identical, and this circuit takes the configuration of a serially connected condenser 35 and rectifier 36, the condenser 35 being connected to the input terminal 30 and the rectifier 36 being poled in the direction to allow conventional current flow toward the respective anode 12. A second rectifier 37 is included in the can circuit having its cathode connected to the junction 38 of the condenser 35 and rectifier 36 and its anode connected to another terminal 39 of the can 25, the other cans 26, 27 having corresponding terminals 40, 41.

In the plural arrangement shown in FIG. 1, all of the can input terminals 30–32 are connected in common to line 28 which is connected in turn to the energized line of the power transformer 20 and the terminals 39–41 are connected in common to line 42. Line 42 is shown connected to ground 43 which in this embodiment involves a wire connection to an earth ground. Alternatively, since the tank 10 is buried in the ground and is at that potential a direct connection may be made to the tank 10 as shown by dashed line 44. It is to be noted that a direct connection between the ground line 22 of the power transformer 20 and the ground connection for the circuitry within the cans 25–27, is not necessary although in certain environments it is advantageous to confirm this connection with a direct wire.

Additionally, for test purposes it is desirable to be able to connect an ammeter in the can circuitry to monitor either the individual current flow in the cans 25–27 or the total current flow in the complete system. The ground connection is the preferable location for performing this measurement since it avoids breaking a "hot" line and minimizes the chances for accidental contact with the high potentials appearing within the circuit. Conveniently in the FIG. 1 embodiment of this invention, the ammeter 45 is inserted by means of a plug in a normally closed circuit jack 46 in series with the line 42 joining the terminals 39–41 of the cans 25–27 with ground potential.

It is of prime importance to regulate the current flow from the cans 25–27 to each of the anode-tank circuits and the condenser input rectifier system of this invention performs this function. At the usual 60 Hz. frequency of the power source, sufficient impedance is realized in the condenser 35 to maintain the output current from anode 12 to tank 10 at a relatively constant value. As pointed out previously, varying ground conditions may affect the load upon the circuits and it should be appreciated that the relatively high impedance value of the condenser 35 will maintain a relatively constant voltage drop thereacross and thus a constant current flow, even though the load on the circuit may vary anywhere from approximately 0 to 300 ohms. Additionally, since condensers are very efficient devices and present almost a pure reactance to impressed power, the regulating impedance is realized without the generation of a substantial amount of heat in the condenser 35. Therefore, the components of each circuit may be packaged in a relatively small can and will not be affected over their lifetime by excessive heat. In this embodiment of the invention the condenser 35 has a preferred value of 6 mfd. at a 200 volt rating.

Further, it is preferable that the condenser 35 in this circuit be of metalized Mylar construction in that this type of condenser has an inherent self-restoring feature. Thus, even though the condenser 35 may be temporarily shorted or burned through, due to a lightning stroke or a fault within the condenser itself, it will recover over a short interval of time to reestablish the operating conditions for the circuit. Similarly, voltage transients in the power lines due to the switching of heavy loads upon the power transformer 20, which normally serves a plurality of users, may damage the condenser 35 temporarily and the self-recovery feature is significant in avoiding the loss of output current over a long interval of time and the necessity for frequent maintenance.

Condenser 35 serves a further purpose in this circuit in aiding in the regulation of output current. Due to the phase shift between voltage and current within the condenser and the charging characteristic of same, the waveshape of the voltage applied to the rectifier 36 is modified from the pure sine wave configuration received from the power transformer 20. In effect, some smoothing of the waveshape occurs so that a more constant voltage is applied to the rectifier 36 resulting in a purer output current from anode 12.

The rectifier 36 which converts the AC voltage as modified by the input condenser 35 to DC voltage, is preferably a silicon semiconductor diode having a one ampere 600 volt rating. Such diodes are noted for their relatively low forward voltage drop and extremely high back impedance. These characteristics insure that little power will be dissipated during the conduction intervals of the diode 36 and that only a minute amount of reverse current flow will be allowed.

As is well known, any half cycle rectifier circuit utilizes only a portion of the power supply voltage, in this instance the positive half cycle of the voltage from the power transformer 20. In effect then, an unbalanced utilization of power is realized and a concurrent DC level is imposed on the secondary winding 21 of the power transformer 20. In this particular system since there is a plurality of half wave circuits connected to a single power transformer 20, an appreciable amount of unbalance may occur which will create a substantial DC level on the power lines. Various community codes have been enacted to prevent such undesirable conditions since it is common for a plurality of users to be served by a common power transformer. It is believed that the circuitry of the instant invention is unique in alleviating this problem. Thus, on the positive half cycle of the power wave rectifier 36 will become forward biased to conduct current flow to the anode 12 and since this is a unidirectional flow of current some charging of the input condenser 35 will occur. The second rectifier 37 creates a path for current flow on the negative half cycles of the power source, wherein current will flow primarily from ground 43 through the input condenser 35 in a reverse direction. Such reverse current flow serves a dual purpose of balancing the utilization of power from the power transformer 20 and thus avoiding the occurrence of a DC level therein and simultaneously discharges the condenser 35 to avoid a build-up of voltage thereon and a subsequent blocking effect which would interfere with the desired current flow.

Further, a fixed resistor 48 of relatively high resistance value is connected across the condenser 35 within the cans. The purpose of resistor 48 is to dissipate any residual charge which may occur in the condenser 35 when the circuit is turned off or when the condenser 35 is removed for testing or maintenance purposes. In usual practice this resistor 48 has a value of approximately 100,000 ohms which is sufficiently high so as not to affect the normal operation of the circuit.

FIG. 2 shows a second embodiment of this invention and includes a plurality of cans 51–53 shown in dashed lines connected in parallel to a power source transformer 54 and having output terminals 55–57 connected to respective anodes 58–60 associated with an underground tank 61. Again only one can circuit 51 will be described, since all are identical and this comprises an isolation transformer 64 having a primary winding 65 connected by way of input terminals 66, 67 across the energized 68 and neutral 69 lines of the power transformer 54 and a secondary winding 70 for providing approximately 115 volts of output to the remainder of the circuit of the can 51.

The transformer 64 is primarily for isolation purposes and may be a relatively compact unit requiring only the capability of handling approximately 7 volt amperes. A bridge type rectifier circuit 72 consisting of four rectifiers 73–76 is provided having input connections at the junctions 77, 78 between the first and second rectifiers 73, 74 and third and fourth rectifiers 75, 76, respectively. Such first and second rectifiers 73, 74 correspond to those described in the preferred embodiment of the invention and the third and fourth rectifiers 75, 76 are provided primarily for utilization of the full wave of power at the anode 58 circuit. A condenser 80 is interposed between one side of the secondary winding 70 and junction 77 between the first and second rectifiers 73, 74. It has been determined in practice that in order to achieve an output current flow of approximately 120 milliamps, a condenser 80 of approximately 3 m.f.d. is required. Condenser 80 is also preferably of metalized Mylar construction to provide the inherent self-healing feature described in the first embodiment. A resistor 82 of approximately 100,000 ohms is connected in parallel across the condenser 80 and provides the discharge of same upon removal from the circuit.

Output power is derived from the bridge rectifier 72 in the conventional manner, the respective anode 58 being connected to the junction 83 between the first and fourth rectifiers 73, 76 and ground potential 84 being connected to the junction 85 between the second and third rectifiers 74, 75 by way of line 86. As in the first embodiment of the invention, the ground terminals 87–89 for each of the cans 51–53 are joined together and connected to either ground 84 directly or to the tank 61 and provision is made for insertion of an ammeter 90 in series with this circuit to provide an indication of total current flow for the system.

It will be apparent then that even though the neutral line 69 of the power transformer 59 is connected to ground, complete isolation for the cans 51–53 is provided by the respective isolation transformers contained therein. By conventional circuit analysis it is seen that each condenser 80 in the circuit acts similar to the condenser 35 described in the first embodiment in providing a regulating impedance value and being subjected to alternate current flow in the forward and reverse directions. It is also clear that the bridge rectifier 72 configuration provides a forward conductive path for current flow from anode 58 to tank 61 for each half cycle of the power source. Therefore, a balanced utilization of power will be realized and no DC component will be introduced into the power transformer 54.

The use of the condenser 80 in this embodiment of the invention provides the same type of advantages as outlined previously, these being the waveshape modification to provide a smoothing effect for the voltage applied to the bridge rectifier 72, the necessary voltage drop and therefore, regulation, the self-restoring characteristic, and the performance of these objectives with the absence of a substantial amount of power dissipation in the form of heat.

Other modes of applying the principles of the invention may be employed, change being made as regards the details described, provided the features stated in any of the following claims or the equivalent of such be employed.

I, therefore, particularly point out and distinctly claim as my invention:

1. A cathodic protection system for providing a flow of direct current to a protected device buried underground, such current flow being derived from a conventional power line source of supply having energized and grounded conductors, said system comprising a plurality of circuits connected in common to the source of supply, each circuit contributing to the total current flow and comprising, an anode buried in the ground near the protected device to constitute one electrode for the flow of current, the protected device being the second electrode at ground potential, a first rectifier serially connected between the power source and said anode for conducting the positive half-cycles of alternating current of the power source to create forward current flow from said anode to the protected device, a capacitor serially connected between the power source and said first rectifier for varying the waveshape of the power source current for application to said first rectifier, a second rectifier connected from the junction of said first rectifier and said capacitor to ground potential for providing a reverse current flow through said capacitor on the negative half cycles of the alternating current power source, and an earth connection between said device and the power source providing a return current path, the combination thereby providing a balanced utilization of the current of the power source and a regulated flow of current to the protected device.

2. A cathodic protection system as set forth in claim 1 wherein said second rectifier of each said circuit is connected to a common junction and further including an ammeter connected between such junction and ground potential thereby to register total current flow of the system.

3. A cathodic protection system as set forth in claim 1 wherein each said capacitor is a metalized Mylar capacitor which is self-healing and is capable of shunting high transient voltages such as lightning strokes.

4. A cathodic protection system as set forth in claim 3 wherein said rectifiers are silicon diodes having a one ampere, 600 volt rating, and each said capacitor is a 6 mfd., 200 volt capacitor.

5. A cathodic protection system as set forth in claim 1 further including in each circuit third and fourth rectifiers connected to said first and second rectifiers to provide a birdge rectifier configuration, and an isolation transformer having a primary winding connected to the power source and having a secondary winding connected at one end to said capacitor and connected at the other to the junction between said third and fourth rectifiers, said system thereby providing direct current flow to the protected device for the full cycle of the alternating current power source.

References Cited

UNITED STATES PATENTS

| | | | |
|---|---|---|---|
| 1,962,696 | 6/1934 | Rhodes | 204—196 |
| 3,135,677 | 6/1964 | Fischer | 204—196 |

T. TUNG, Primary Examiner